United States Patent
Onozaki et al.

(10) Patent No.: US 12,512,275 B2
(45) Date of Patent: Dec. 30, 2025

(54) ELECTROLYTIC CAPACITOR COMPRISING AN ANODE BODY INCLUDING A POROUS BODY WITH A SOLID ELECTROLYTE LAYER PROVIDED THEREIN

(71) Applicant: Panasonic Intellectual Property Management Co., Ltd., Osaka (JP)

(72) Inventors: Junko Onozaki, Hokkaido (JP); Yuki Ueda, Osaka (JP); Yoshihisa Nagasaki, Osaka (JP); Yoshitaka Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 118 days.

(21) Appl. No.: 18/554,466

(22) PCT Filed: Apr. 25, 2022

(86) PCT No.: PCT/JP2022/018751
§ 371 (c)(1),
(2) Date: Oct. 7, 2023

(87) PCT Pub. No.: WO2022/230818
PCT Pub. Date: Nov. 3, 2022

(65) Prior Publication Data
US 2024/0194416 A1    Jun. 13, 2024

(30) Foreign Application Priority Data
Apr. 30, 2021    (JP) .................. 2021-077889

(51) Int. Cl.
*H01G 9/15*    (2006.01)
*H01G 9/025*    (2006.01)
*H01G 9/042*    (2006.01)

(52) U.S. Cl.
CPC ............... *H01G 9/15* (2013.01); *H01G 9/025* (2013.01); *H01G 9/042* (2013.01)

(58) Field of Classification Search
None
See application file for complete search history.

(56) References Cited

U.S. PATENT DOCUMENTS

| 6,151,205 A | 11/2000 | Kobayashi et al. |
| 2009/0086413 A1 | 4/2009 | Takatani et al. |

(Continued)

FOREIGN PATENT DOCUMENTS

| JP | 11-087177 | 3/1999 |
| JP | 3228323 B | 11/2001 |

(Continued)

OTHER PUBLICATIONS

International Search Report of PCT application No. PCT/JP2022/018751 dated Jul. 19, 2022.

*Primary Examiner* — Eric W Thomas
(74) *Attorney, Agent, or Firm* — WHDA, LLP

(57) ABSTRACT

An electrolytic capacitor includes an anode body that includes a porous body and a dielectric layer covering the porous body, and a solid electrolyte layer that covers the dielectric layer. The porous body has a first region located near an outer surface of the porous body, and a second region other than the first region. The first region is a region in which a distance from the outer surface of the porous body is shorter than 0.5D, where D is a shortest distance between the outer surface of the porous body and a center of the porous body. A filling proportion R2 of the solid electrolyte layer in the second region is less than a filling proportion R1 of the solid electrolyte layer in the first region. A ratio R2/R1 of the filling proportion R2 to the filling proportion R1 is less than or equal to 1/10.

6 Claims, 4 Drawing Sheets

(56) References Cited

U.S. PATENT DOCUMENTS

| | | | |
|---|---|---|---|
| 2009/0103247 A1* | 4/2009 | Karnik | H01G 9/028 264/618 |
| 2010/0103590 A1* | 4/2010 | Saida | H01G 9/028 427/80 |
| 2010/0214723 A1* | 8/2010 | Karnik | H01G 9/07 29/25.03 |
| 2016/0163466 A1 | 6/2016 | Naito et al. | |

FOREIGN PATENT DOCUMENTS

| JP | 2009-099974 | 5/2009 |
|---|---|---|
| JP | 2016-111371 | 6/2016 |

\* cited by examiner

ELECTROLYTIC CAPACITOR COMPRISING AN ANODE BODY INCLUDING A POROUS BODY WITH A SOLID ELECTROLYTE LAYER PROVIDED THEREIN

TECHNICAL FIELD

The present invention relates to an electrolytic capacitor.

BACKGROUND

In recent years, an electrolytic capacitor that has a small equivalent series resistance (ESR) and excellent frequency characteristics has been developed. An electrolytic capacitor includes an anode body that includes a porous body containing a valve metal and a dielectric layer covering the porous body, and a solid electrolyte layer that is filled in a pore of the porous body to cover the dielectric layer.

Unexamined Japanese Patent Publication No. H11-87177 n proposes a solid electrolytic capacitor in which a conductive polymer compound layer in a central portion of a capacitor element has a thickness of at least from 0.02 µm to 0.14 µm, inclusive. Further, Unexamined Japanese Patent Publication No. H11-87177 proposes that, in the solid electrolytic capacitor, a difference between a thickness of the conductive polymer compound layer in the central portion of the capacitor element and a thickness of the conductive polymer compound layer near an outer surface of the capacitor element is less than or equal to 0.08 µm.

SUMMARY

An aspect of the present invention relates to an electrolytic capacitor. The electrolytic capacitor includes an anode body that includes a porous body and a dielectric layer covering the porous body, and a solid electrolyte layer that covers the dielectric layer. The porous body includes a valve metal. The solid electrolyte layer is filled in a pore of the porous body. The porous body includes a first region located near an outer surface of the porous body, and a second region other than the first region. The first region is a region in which a distance from the outer surface of the porous body is shorter than 0.5D, where D is a shortest distance between the outer surface of the porous body and a center of the porous body. A filling proportion R2 of the solid electrolyte layer in the second region is less than a filling proportion R1 of the solid electrolyte layer in the first region. A ratio R2/R1 of the filling proportion R2 to the filling proportion R1 is less than or equal to $1/10$.

Advantageous Effect of Invention

According to the present invention, an electrolytic capacitor having a low ESR can be provided.

Although novel features of the present invention are set forth in the appended claims, the present invention will be better understood by the following detailed description with the drawings, taken in conjunction with other objects and features of the present invention, both as to construction and content.

DESCRIPTION OF EMBODIMENT

Figure 1:
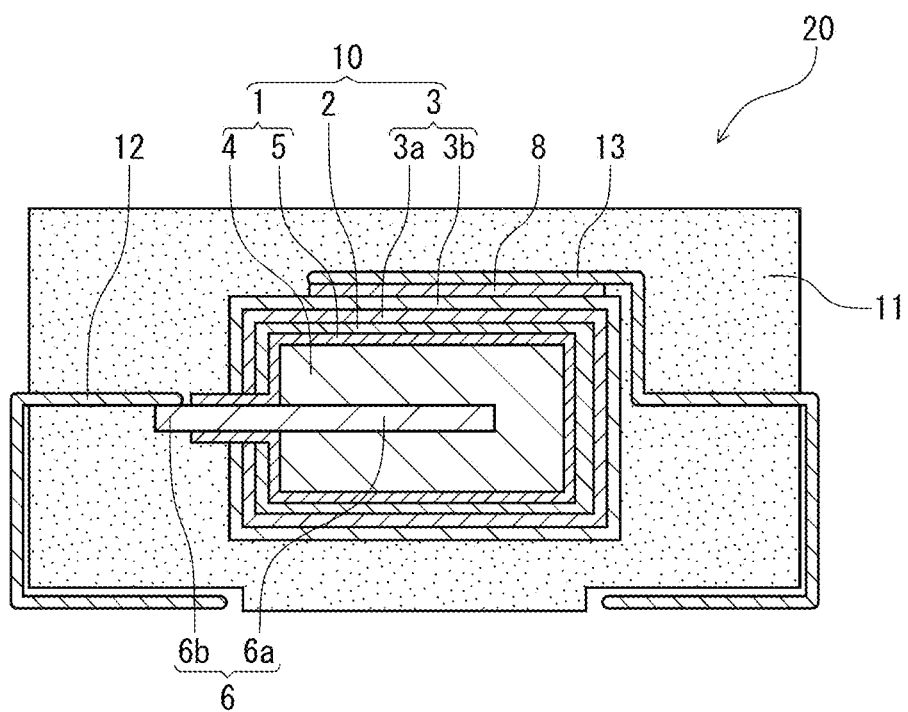
FIG. 1 is a sectional view schematically illustrating an example of an electrolytic capacitor according to an exemplary embodiment of the present invention.

In recent years, a decrease in the ESR of the electrolyte capacitor has been required. In the electrolytic capacitor described in Unexamined Japanese Patent Publication No. H11-87177, an increase in the ESR in a high-temperature environment is suppressed, but the reduction in the ESR of the electrolyte capacitor is still insufficient. Hereinafter, an exemplary embodiment of an electrolytic capacitor according to the present disclosure will be described in conjunction with examples, but the present disclosure is not limited to the examples to be described below. Although specific numerical values and materials may be provided as examples in description below, other numerical values and materials may be applied as long as the effect of the present disclosure can be obtained. In this specification, the description "numerical value A to numerical value B" includes a numerical value A and a numerical value B, and can be read as "between numerical value A and numerical value B (inclusive)". In the following description, in a case where lower limits and upper limits of numerical values related to specific physical properties, conditions, or the like are illustrated, any of the illustrated lower limits and any of the illustrated upper limits can be voluntarily combined unless the lower limit is equal to or more than the upper limit. In a case where a plurality of materials are illustrated, one of the materials may be selected and used alone, or two or more of the materials may be used in combination.

In addition, the present disclosure encompasses a combination of matters recited in two or more claims voluntarily selected from a plurality of claims recited in the appended claims. That is, as long as no technical contradiction arises, matters recited in two or more claims voluntarily selected from a plurality of claims recited in the appended claims can be combined.

The "electrolytic capacitor" may be read as a "solid electrolytic capacitor".

An electrolytic capacitor according to an exemplary embodiment of the present invention includes an anode body that includes a porous body and a dielectric layer covering the porous body, and a solid electrolyte layer that covers the dielectric layer. The porous body includes a valve metal. The solid electrolyte layer is filled in a pore of the porous body. Hereinafter, the anode body and the solid electrolyte layer (or the anode body, the solid electrolyte layer, and a cathode layer to be described later) are collectively referred to as a capacitor element. The porous body includes a first region and a second region other than the first region. The first region is located near an outer surface of the porous body. The first region is a region in which a distance from the outer surface of the porous body is shorter than 0.5D, where D is a shortest distance between the outer surface of the porous body and a center of the porous body.

A filling R2 proportion of the solid electrolyte in the second region less than a filling proportion R1 of the solid electrolyte layer in the first region, and a ratio R2/R1 of the filling proportion R2 to the filling proportion R1 is less than or equal to $1/10$. In this case, an ESR of the electrolytic capacitor can be reduced.

In the first region (near the outer surface of the porous body) where a large amount of current flows, a large amount of the solid electrolyte layer is filled, and thus conductivity is improved. As a result, many conductive paths are formed through the solid electrolyte layer filled in the pore of the porous body, and a current efficiently flows between metal skeletons through the solid electrolyte layer filled in the pore of the porous body together with the metal skeletons constituting the porous body. On the other hand, in the second region (near the center of the porous body), a filling amount of the solid electrolyte layer is suppressed to such an extent that a capacitance can be secured, and thus a current easily flows through a metal skeleton having a low resistance constituting the porous body. An increase in resistance due to the current flowing through the solid electrolyte layer is suppressed. In a case where R2/R1 is less than or equal to $1/10$, the ESR can be effectively decreased together with an action in the first region and an action in the second region which are described above.

From the viewpoint of easily decreasing the ESR, R2/R1 is preferably less than or equal to $3/100$, and more preferably less than or equal to $1/100$. From the viewpoint of easily securing the capacitance, R2/R1 is preferably more than or equal to $1/1000$, and more preferably more than or equal to $3/1000$. From the viewpoint of decreasing the ESR and securing the capacitance, R2/R1 may range from $1/1000$ to $1/10$, inclusive, from $1/1000$ to $3/100$, inclusive, or from $1/1000$ to $1/100$, inclusive.

From the viewpoint of easily decreasing the ESR, R1 is preferably more than or equal to 80%. Similarly, R2 is preferably less than or equal to 9%, more preferably less than or equal to 2.5%. From the viewpoint of securing the capacitance, R2 may be more than or equal to 0.08% or more than or equal to 0.25%.

The filling proportion R (%) of the solid electrolyte layer means, in a cross section of the anode body observed with an electron microscope (a cross section including a line segment defining shortest distance D), a ratio of an area of the solid electrolyte layer in the cross section to an area of a void (pore of the anode body) in the cross section. The area of the void in the cross section means a value obtained by excluding the area of the anode body (a total of the porous body and the dielectric layer) in the cross section from the area of the entire cross section. A scanning electron microscope (SEM) or a transmission electron microscope (TEM) can be used as the electron microscope.

The R1 and R2 can be obtained by the following method.

Cross section polisher (CP) processing is performed on the capacitor element that is taken out from the electrolytic capacitor by disassembling the electrolytic capacitor, and a cross section of a sample for SEM observation is obtained. The cross section of the sample (the cross section of the anode body) is observed by SEM, and an image (for example, magnification: 100 times to 100,000 times) thereof is obtained. From the SEM image, an area S0 (for example, from 0.9 µm² to 1000 µm²) of the entire image, an area S1 of the anode body (the total of the porous body and the dielectric layer), and an area S2 of the solid electrolyte layer are obtained. The filling proportion R (%) is obtained by $\{S2/(S0-S1)\} \times 100$. It is noted that a value obtained by subtracting S1 from S0 is an area of the void.

Filling proportion R1 of the solid electrolyte layer in the first region is obtained by selecting a maximum value among filling proportions R obtained by using SEM images for any number of plural regions (for example, from three regions to five regions) at any depth of the first region from the outer surface of the porous body. At least one region of the plural regions is located in a vicinity of the outer surface of the porous body. It is noted that the vicinity of the outer surface of the porous body means a region where a distance from the outer surface of the porous body is shorter than 0.2D. The filling proportion of the solid electrolyte layer in the vicinity of the outer surface of the porous body may be R1. For example, in a case where 0.5D is in a range from 225 µm to 410 µm, centers of the three regions may be respectively positioned at around the outer surface of the porous body (around 0 µm), at a depth of 50 µm from the outer surface, and at a depth of 100 µm from the outer surface.

Filling proportion R2 of the solid electrolyte layer in the second region is obtained by selecting a maximum value among filling proportions R obtained by using SEM images for any number of plural regions (for example, from three regions to five regions) at any depth of the second region from a boundary between the first region and the second region. At least one region of the plural regions is located in a vicinity of the center of the porous body. It is noted that the vicinity of the center of the porous body means a region where a distance from the center of the porous body is shorter than 0.2D. In a case where there is an anode wire, which will be described later, at the center of the porous body, the vicinity of the center of the porous body means a region near the anode wire. The filling proportion of the solid electrolyte layer in the vicinity of the center of the porous body may be R2. In the above description, the cross section of the sample is observed by SEM, but may be observed by TEM.

It can be confirmed that the filling proportion R is less in the second region than in the first region by the filling proportions R obtained for any number of regions at any depth of the first region and the second region.

From the viewpoint of easily obtaining an effect of reducing the ESR by setting R2/R1 to be less than or equal to $1/10$, a conductivity of the solid electrolyte layer ranges preferably from 15 S/cm (or 20 S/cm) to 500 S/cm, inclusive, and more preferably from 15 S/cm (or 20 S/cm) to 300 S/cm, inclusive. Similarly, the conductivity of the solid electrolyte layer ranges more preferably from 15 S/cm (or 20 S/cm) to 200 S/cm, inclusive, and particularly preferably from 15 S/cm (or 20 S/cm) to 150 S/cm, inclusive.

From the viewpoint of decreasing the ESR and securing the capacitance, in a case where the conductivity of the solid electrolyte layer ranges from 15 S/cm (or 20 S/cm) to 150 S/cm, inclusive, R1 may be more than or equal to 80%, and R2/R1 may range from $1/1000$ to $1/10$, inclusive (preferably from $1/100$ to $1/10$, inclusive).

Similarly, in a case where the conductivity of the solid electrolyte layer is more than 150 S/cm and less than or equal to 200 S/cm, R1 may be more than or equal to 80%, and R2/R1 may be more than or equal to $1/1000$ and less than $1/10$ (preferably more than or equal to $1/100$ and less than $1/10$).

Similarly, in a case where the conductivity of the solid electrolyte layer is more than 200 S/cm and less than or equal to 300 S/cm, R1 may be more than or equal to 80%, and R2/R1 may be more than or equal to $1/1000$ and less than $3/100$ (preferably more than or equal to $1/100$ and less than $3/100$).

Similarly, in a case where the conductivity of the solid electrolyte layer is more than 300 S/cm and less than or equal to 500 S/cm, R1 may be more than or equal to 80%, and R2/R1 may be more than or equal to $1/1000$ and less than $1/100$.

The conductivity of the solid electrolyte layer can be obtained by the following method.

The electrolytic capacitor is disassembled, and the capacitor element is taken out from the electrolytic capacitor. And then components of the solid electrolyte layer are analyzed. In a case where the solid electrolyte layer is formed by using a first treatment liquid or a second treatment liquid, components of the first treatment liquid or the second treatment liquid may be analyzed. A transmission electron microscope (TEM)-electron energy loss spectroscopy (EELS) method, a nuclear magnetic resonance spectroscopy (NMR) method, Raman spectroscopy, or the like can be used as the analysis method.

Based on the analysis result, a sample film (for example, a thickness ranging from 20 µm to 40 µm) containing the same components as the solid electrolyte layer is formed, and a conductivity of the sample film is obtained as the conductivity of the solid electrolyte layer. LORESTA-GX and a PSP probe manufactured by Nittoseiko Analytech Co., Ltd. can be used as a conductivity measurement device.

In a case where the solid electrolyte layer is formed by using the first treatment liquid or the second treatment liquid, which will be described later, the sample film may be formed by using the first treatment liquid or the second treatment liquid. In a case where the solid electrolyte layer includes a first layer and a second layer, which will be described later, a sample film having a stacked structure of the first layer and the second layer similar to the solid electrolyte layer may be formed. A thickness ratio between the first layer and the second layer in the sample film may be appropriately determined in accordance with a thickness ratio T2/T1, which will be described later. Thickness T1 can be regarded as a total thickness of the first layer and the second layer. Thickness T2 can be regarded as a thickness of the first layer.

The thickness ratio T2/T1 is a ratio of thickness T2 of the solid electrolyte layer in the vicinity of the center of the porous body (the region where the distance from the center is shorter than 0.2D) to thickness T1 of the solid electrolyte layer in the vicinity of the outer surface of the porous body (the region where the distance from the outer surface is shorter than 0.2D), and may be, for example, less than or equal to 0.1, and may range from 0.01 to 0.1, inclusive. Thickness T2 of the solid electrolyte layer in the vicinity of the center of the porous body is, for example, less than 0.02 µm (or less than or equal to 0.017 µm). The solid electrolyte layer having thickness T1 can be formed of, for example, the first layer and the second layer, which will be described later. The solid electrolyte layer having thickness T2 can be formed of, for example, the first layer, which will described later.

Thickness T1 of the solid electrolyte layer is obtained by calculating an average value of thicknesses measured at any 10 points in the vicinity of the outer surface of the porous body by using an SEM image of a cross section of the sample obtained similarly to a case where the R1 and R2 are obtained. Thickness T2 of the solid electrolyte layer is obtained by calculating an average value of thicknesses measured at any 10 points in the vicinity of the center of the porous body.

(Porous Body)

The porous body includes a valve metal. Examples of the valve metal include aluminum (Al), titanium (Ti), tantalum (Ta), niobium (Nb), zirconium (Zr), and hafnium (Hf).

For example, a sintered body of a molded body of raw material particles (raw material powder) containing the valve metal is used as the porous body. The particles may be particles of the valve metal, particles of an alloy containing the valve metal, or particles of a compound containing the valve metal. Only one of these kinds of particles may be used, or two or more thereof may be used in mixture.

The porous body can be obtained, for example, by compression-molding raw material particles into a predetermined shape to obtain the molded body and sintering the molded body. For example, the molded body may be obtained by disposing the anode wire at a predetermined position of a mold, inserting raw material particles into the mold, and compression-molding the raw material particles. The porous body in which a part of the anode wire is embedded may be obtained by sintering the molded body. The porous body is usually a rectangular parallelepiped.

(Anode Wire)

The anode body may include a rod-shaped anode wire partially embedded in the porous body. A part of the anode wire may be embedded in the porous body to pass through the center of the porous body. In a case where the porous body is the rectangular parallelepiped, the anode wire is planted from one end surface of the rectangular parallelepiped. The anode wire may contain the valve metal. A part of the anode wire is embedded in the porous body, and the rest part of the anode wire protrudes from the porous body. The rest part is connected to an anode lead terminal by welding or the like.

(Dielectric Layer)

The dielectric layer is formed to cover the outer surface of the porous body and an inner wall surface of the pore of the porous body. For example, the dielectric layer is formed by performing an anodizing treatment on the porous body and causing a growth of an oxide film at a surface of the porous body. The anodizing treatment may be performed by immersing the porous body in an anodizing solution and performing anodic oxidation on the surface of the porous body. Alternatively, the porous body may be heated under an atmosphere containing oxygen to oxidize the surface of the porous body.

(Solid Electrolyte Layer)

The solid electrolyte layer is disposed to cover at least a part of the dielectric layer. The solid electrolyte layer may be filled in the pore of the porous body with the dielectric layer interposed therebetween and may be formed on the outer surface of the porous body. The solid electrolyte layer may be a stacked body of two or more different solid electrolyte layers.

The solid electrolyte layer contains, for example, a conductive polymer. The conductive polymer may be a π-conjugated polymer, and examples of the conductive polymer include polypyrrole, polythiophene, polyaniline, and derivatives thereof. These polymers may be used alone or may be in combination of a plurality of polymers. In addition, the conductive polymer may be a copolymer from two or more kinds of monomers. It is noted that a derivative of the conductive polymer means a polymer having the conductive polymer as a basic skeleton. Examples of a derivative of polythiophene include poly(3,4-ethylenedioxythiophene) (PEDOT).

A dopant may be added to the conductive polymer. That is, the solid electrolyte layer may contain the conductive polymer and the dopant. The conductive polymer may be contained in the solid electrolyte layer in a state of being doped with the dopant. The dopant can be selected depending on the conductive polymer, and a known dopant may be used. Examples of the dopant include benzenesulfonic acid, alkylbenzenesulfonic acid, naphthalenesulfonic acid, alkylnaphthalenesulfonic, polystyrenesulfonic acid (PSS), and salts thereof. The solid electrolyte layer includes, for example, PEDOT doped with PSS.

The solid electrolyte layer containing the conductive polymer can be formed, for example, by impregnating a porous body (anode body) having a dielectric layer formed on a surface thereof with a first treatment liquid containing a monomer (or oligomer) and then polymerizing the monomer (or oligomer) by chemical polymerization or electrolytic polymerization. In the case of chemical polymerization, the first treatment liquid contains, for example, a monomer (or oligomer), an oxidizing agent, and a solvent (or dispersion medium). Examples of the monomer include 3,4-ethylenedioxythiophene (EDOT) and pyrrole. The first treatment liquid may further contain a dopant.

In addition, the solid electrolyte layer may be formed by impregnating a porous body (anode body) having a dielectric layer formed on a surface thereof with a second treatment liquid containing a conductive polymer and drying the second treatment liquid. The second treatment liquid contains, for example, a conductive polymer, a solvent (or a dispersion medium), and a dopant as necessary.

The conductivity of the solid electrolyte layer can be adjusted, for example, by changing a conductive polymer, a dopant, polymerization conditions (polymerization method, oxidant, and the like), and the like.

A step of forming the solid electrolyte layer may include a first step of forming a solid electrolyte layer (hereinafter, also referred to as a first layer) having a small thickness to be thin in a first region and a second region, and a second step of forming a solid electrolyte layer (hereinafter, also referred to as a second layer) having a large thickness in the first region (particularly, near an outer surface of a porous body) after the first step. In this case, it is easy to control R2/R1 to be less than or equal to $1/10$. It is easy to control R1 to a filling proportion based on a total of the first layer and the second layer. It is easy to control R2 to a filling proportion based on the first layer. Components (conductive polymer, dopant, and the like) contained in the first layer and the second layer may be the same as or may be different from each other.

In the first step, chemical polymerization may be performed at a low temperature (for example, within a temperature range in which chemical polymerization can be performed at 10° C. or less). In this case, the diffusion of the first treatment liquid (polymerization solution) is suppressed, and a solid electrolyte layer having a small thickness is easily formed in the first region and the second region.

In the second step, electrolytic polymerization may be performed such that a second layer having a large thickness is formed in the first region. For example, electrolytic polymerization may be performed in a plurality of steps by changing a current value. For example, step (2a) of performing electrolytic polymerization with a large current may be performed, and step (2b) of performing electrolytic polymerization for a relatively long time with a small current may be performed after step (2a). In step (2a), a second layer having a large thickness can be formed to some extent to close the pores of the porous body in the first region. Thus, the formation of the second layer in step (2b) is performed in the first region, and is suppressed in the second region. As a result, in step (2b), a filling proportion of the solid electrolyte layer can be sufficiently increased in the first region such that R2/R1 is less than or equal to $1/10$ by performing the electrolytic polymerization at a small current for a relatively long time.

(Others)

The capacitor element may include a cathode layer covering at least a part of the solid electrolyte layer. The electrolytic capacitor may include an anode lead terminal and a cathode lead terminal electrically connected to the capacitor element, and an outer packaging resin disposed around the capacitor element. The cathode lead terminal is connected to a cathode part via a conductive member. The anode lead terminal is connected to an end of the anode wire protruding from the porous body. The shape, size, and the like of the capacitor element are not particularly limited, and the capacitor element may be a known capacitor element or a capacitor element that has a configuration similar to the known capacitor element.

(Cathode Layer)

The cathode layer may include a carbon layer formed on the solid electrolyte layer and a metal paste layer formed on the carbon layer. The carbon layer may be formed from a conductive carbon material such as graphite and a resin. The metal paste layer may be formed by metal particles (for example, silver particles) and resin, and may be formed by, for example, a known silver paste.

(Conductive Member)

The cathode layer is connected to a connection portion of the cathode lead terminal by the conductive member. That is, the cathode layer (cathode part) is electrically connected to the cathode lead terminal. The conductive member is made of a material having conductivity. The conductive member may be made of a material containing metal particles (for example, silver particles) and a resin, and may be made of, for example, a known metal paste (for example, silver paste). The conductive member is formed by heating the metal paste. Note that, the conductive member may include a plurality of conductive layers of different types.

(Outer Packaging Resin)

The outer packaging resin is disposed around the capacitor element so that the capacitor element is not exposed on a surface of the electrolytic capacitor. Furthermore, the outer packaging resin insulates the anode lead terminal from the cathode lead terminal. Known outer packaging resin used for an electrolytic capacitor may be applied to the outer packaging resin. For example, the outer packaging resin may be formed with the use of an insulating resin material that is used for sealing the capacitor element. The outer packaging resin may be formed by placing the capacitor element in a mold, introducing an uncured thermosetting resin and filler into the mold in accordance with a transfer molding method, a compression molding method, or the like, and then curing the resin and the filler.

Examples of the outer packaging resin include epoxy resin, phenol resin, silicone resin, melamine resin, urea resin, alkyd resin, polyurethane, polyimide, unsaturated polyester, and the like. The outer packaging resin may contain a substance (such as an inorganic filler) other than the resin.

(Cathode Lead Terminal)

A part of the cathode lead terminal is exposed from the outer packaging resin, and is used as a cathode external terminal. A material of the cathode lead terminal may be any material that can be used as a material of the cathode lead terminal of the electrolytic capacitor. For example, a known cathode lead terminal material used in an electrolytic capacitor may be used. The cathode lead terminal may be formed by, for example, processing a metal sheet (including a metal plate and a metal foil) made of a metal (copper, a copper alloy, or the like) by a known metal processing method.

(Anode Lead Terminal)

A part of the anode lead terminal is exposed from the outer packaging resin, and is used as an anode external terminal. A material of the anode lead terminal may be any material that can be used as the material of the anode lead terminal of the electrolytic capacitor. For example, a material of a known anode lead terminal used for the electrolytic capacitor may be used. The anode lead terminal may be formed by, for example, processing a metal sheet (including a metal plate and a metal foil) made of a metal (copper, a copper alloy, or the like) by a known metal processing method.

Figure 2:
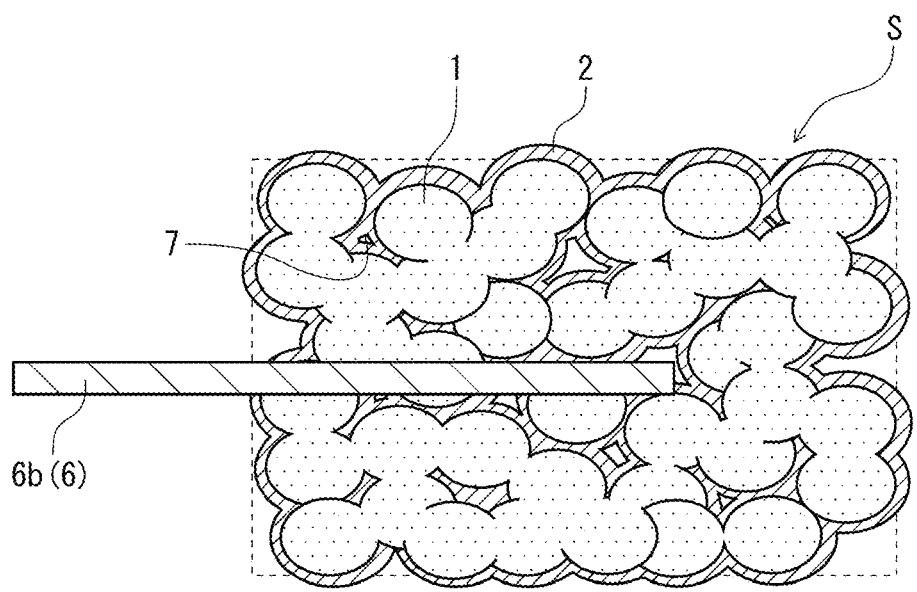
FIG. 2 is a sectional view schematically illustrating an anode body having a solid electrolyte layer formed on a surface.
Figure 3:
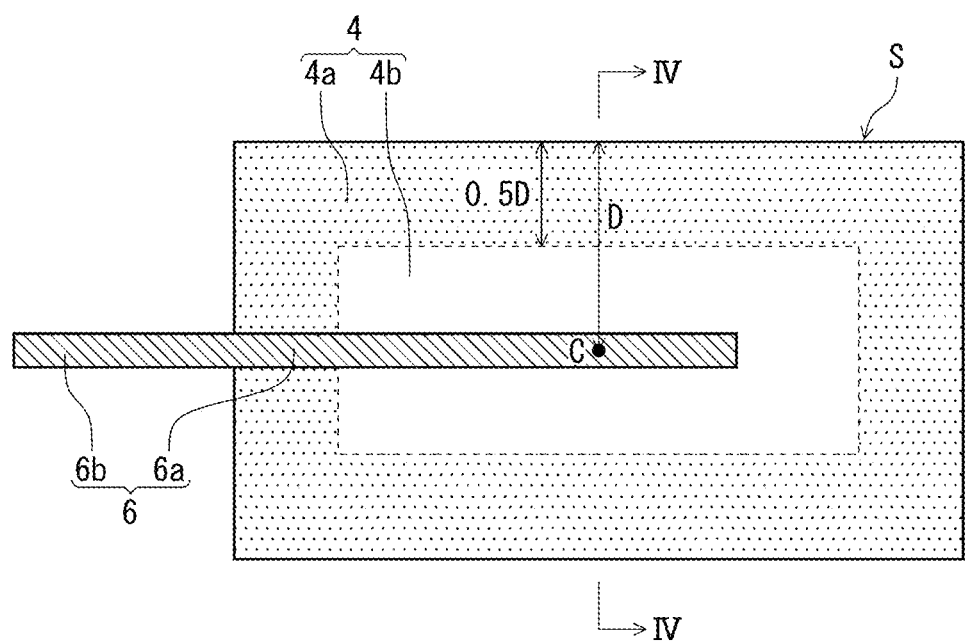
FIG. 3 is a sectional view showing a first region and a second region of a porous body.
Figure 4:
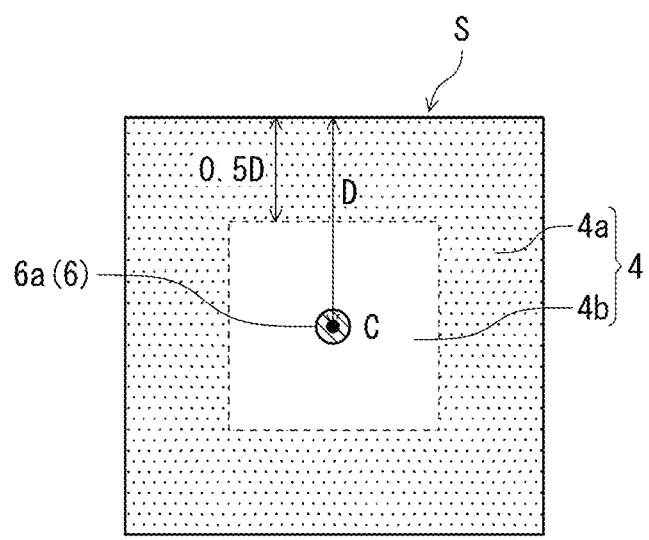
FIG. 4 is a sectional view taken along line IV-IV of FIG. 3.

FIG. 1 is a sectional view schematically illustrating an example of the electrolytic capacitor according to the present exemplary embodiment. FIG. 2 is a sectional view schematically showing the anode body including the solid electrolyte layer formed on the surface. FIG. 3 is a sectional view illustrating the first region and the second region of the porous body. FIG. 4 is a sectional view taken along line IV-IV of FIG. 3. FIGS. 3 and 4 are sectional views including a center C of the porous body. Note that, each drawing is schematically illustrated, and a ratio of dimensions (length, width, thickness, and the like) of components and the like are not necessarily identical as actual ones.

Electrolytic capacitor 20 usually includes capacitor element 10, outer packaging resin 11 that seals capacitor element 10, and anode lead terminal 12 and cathode lead terminal 13 electrically connected to capacitor element 10. A part of anode lead terminal 12 and a part of cathode lead terminal 13 are individually exposed from outer packaging resin 11. A part of anode lead terminal 12 and a part of cathode lead terminal 13 are covered with outer packaging resin 11 together with capacitor element 10.

Capacitor element 10 includes anode body 1, solid electrolyte layer 2 formed on anode body 1, and cathode layer 3 formed on solid electrolyte layer 2. Anode body 1 includes porous body 4 containing a valve metal, and dielectric layer 5 covering porous body 4. Dielectric layer 5 is formed to cover outer surface S of porous body 4 and an inner wall surface of pore 7. Anode body 1 has substantially the same porous shape as porous body 4.

Porous body 4 has a substantially rectangular parallelepiped shape and has six side surfaces. A part of anode wire 6 extends from one side surface of porous body 4. That is, anode wire 6 includes first portion 6a embedded in porous body 4 on one side surface of porous body 4, and second portion 6b extending from the one side surface of porous body 4. Second portion 6b is joined to anode lead terminal 12 by welding or the like. In the present exemplary embodiment, first portion 6a is embedded in porous body 4 to pass through center C of porous body 4, but may be embedded in porous body 4 not to pass through center C of porous body 4.

Solid electrolyte layer 2 is formed to cover at least a part of dielectric layer 5. Solid electrolyte layer 2 is filled in pore 7 of porous body 4 (anode body 1). Solid electrolyte layer 2 is formed to cover outer surface S of porous body 4 and the inner wall surface of pore 7 with dielectric layer 5 interposed therebetween.

As shown in FIGS. 3 and 4, porous body 4 includes first region 4a located near the outer surface of porous body 4, and second region 4b other than first region 4a. When a shortest distance from outer surface S of porous body 4 to center C is defined as D, first region 4a is a region (shaded portion in FIGS. 3 and 4) where a distance from outer surface S of porous body 4 is shorter than 0.5D. A filling proportion of solid electrolyte layer 2 in porous body 4 is less in second region 4b than in first region 4a. A ratio R2/R1 of filling proportion R2 of solid electrolyte layer 2 in second region 4b to filling proportion R1 of solid electrolyte layer 2 in first region 4a is less than or equal to 1/10.

Cathode layer 3 is formed to cover a surface of solid electrolyte layer 2. Cathode layer 3 includes, for example, carbon layer 3a formed to cover solid electrolyte layer 2 and metal paste layer 3b formed on a surface of carbon layer 3a. Cathode lead terminal 13 is joined to cathode layer 3 (metal paste layer 3b) with conductive member 8 interposed therebetween. Carbon layer 3a contains a conductive carbon material such as graphite and resin. Metal paste layer 3b contains, for example, metal particles (for example, silver) and resin. Note that, cathode layer 3 is not limited to this configuration. The configuration of cathode layer 3 may have a current collecting function.

EXAMPLES

Hereinafter, the present invention is specifically described with reference to examples and comparative examples, but the present invention is not limited to the following examples.

Examples 1 to 6

(Production of Porous Body)

One end of the anode wire was embedded in Ta particles, and then the Ta particles are molded to form a molded body of a rectangular parallelepiped shape. After that, the molded body was sintered in vacuum. By doing this, a porous body (Ta sintered body) in which a part of the anode wire was embedded was obtained. Shortest distance D from an outer surface of the porous body to a center of the porous body was 450 µm. A Ta wire was used as the anode wire.

(Formation of Dielectric Layer)

The porous body in which a part of the anode wire was embedded was immersed in an anodizing tank filled with a phosphoric acid aqueous solution as an electrolyte solution to perform anodic oxidation. By doing this, an oxide film (dielectric layer) was formed on the surface of the porous body. Note that, in the anodic oxidation, a concentration of the phosphoric acid can be appropriately selected in a range from 0.01 mass % to 5 mass %, inclusive, an anodizing voltage can be appropriately selected in a range from 2 V to 100 V, inclusive, and a temperature can be appropriately selected in a range from 20° ° C. to 80° C., inclusive.

(Formation of Solid Electrolyte Layer)

(First Step)

First, a first layer (conductivity 21 S/cm) containing polypyrrole and a dopant was formed to be thin in a first region and a second region of a porous body that includes a dielectric layer on the surface (first step). A sulfonate having a naphthalene skeleton was used as the dopant. The first layer was formed by chemical polymerization. The chemical polymerization was performed by using a treatment liquid containing pyrrole, a dopant, an oxidizing agent, and water. The first layer was formed to be thin in the first region and the second region by performing chemical polymerization at a low temperature (within a temperature range in which chemical polymerization can be performed at 10° C. or less), and thickness T2 of the solid electrolyte layer in a vicinity of the center of the porous body was set to a value represented in Table 1.

(Second Step)

Subsequently, a second layer (conductivity 21 S/cm) containing polypyrrole and a dopant was formed to be thick in the first region of the porous body that includes the dielectric layer on the surface (second step). The same dopant as the dopant used for the formation of the first layer was used as the dopant. The second layer was formed by electrolytic polymerization. The electrolytic polymerization was performed by using a treatment liquid containing pyrrole, a dopant, and water. Step (2a) of performing electrolytic polymerization at 25° C. with a large current was performed, and step (2b) of performing electrolytic polymerization for a relatively long time with a small current was performed after step (2a). As a result, the second layer was formed to be thick in the first region, and thickness T1 of the solid electrolyte layer in a vicinity of the outer surface of the porous body was set to a value represented in Table 1.

By doing this, in the second region, the solid electrolyte layer was substantially formed of the first layer. In the first region (particularly near the outer surface of the porous body), the solid electrolyte layer was formed of the first layer and the second layer. By doing this, the solid electrolyte layer was formed such that a filling proportion of the solid electrolyte layer in the porous body was less in the second region than in the first region. A conductivity of the solid electrolyte layer was 21 S/cm.

In the above description, filling proportion R2 of the solid electrolyte layer in the second region was set to a value represented in Table 1 by adjusting a temperature during chemical polymerization in the first step (step of forming the first layer). Filling proportion R1 of the solid electrolyte layer in the first region was set to a value represented in Table 1 by adjusting a magnitude of a current and a time for causing the current to flow during electrolytic polymerization in the second step (step of forming the second layer).

Note that, filling proportion R1 of the solid electrolyte layer in the first region and filling proportion R2 of the solid electrolyte layer in the second region were obtained by the method described above at a point in time at which the solid electrolyte layer was formed. Further, thickness T1 of the solid electrolyte layer in the vicinity of the outer surface of the porous body and thickness T2 of the solid electrolyte layer in the vicinity of the center of the porous body were also obtained by the method described above. Obtained T1 value and T2 value are represented in Table 1.

(Formation of Cathode Layer)

A dispersion liquid (carbon paste) of carbon particles was applied to the solid electrolyte layer, and was heated to form a carbon layer on the surface of the solid electrolyte layer. A metal paste containing silver particles, a binder resin, and a solvent was applied onto the surface of the carbon layer, and was heated to form a metal paste layer. Thus, a cathode layer composed of the carbon layer and the metal paste layer was obtained. By doing this, the capacitor element was obtained.

(Production of Electrolytic Capacitor)

A conductive adhesive serving as a conductive member was applied to the metal paste layer, and a cathode lead terminal and the metal paste layer were joined. The anode wire and the anode lead terminal were joined by resistance welding. Subsequently, the capacitor element to which each lead terminal was joined was sealed with an outer packaging resin. By doing this, the electrolytic capacitor was obtained. In Table 1, X1 to X6 represents electrolytic capacitors of Examples 1 to 6, respectively.

Comparative Example 1

In the second step of the step of forming the solid electrolyte layer, the second layer was also formed to some extent in the second region (near the center of the porous body) by performing electrolytic polymerization at 25° ° C. with a small current for a relatively long time (without performing step (2a)), and thickness T2 of the solid electrolyte layer near the center of the porous body was set to a value represented in Table 1. Filling proportion R2 of the solid electrolyte layer in the second region was set to a value represented in Table 1, and R2/R1 was set to 3/10.

Except for the above description, electrolytic capacitor Y1 was produced similarly to electrolytic capacitor X1 of Example 1.

[Evaluation 1]

An electrostatic capacity (μF) at a frequency of 120 Hz and ESR (mΩ) at a frequency of 100 kHz were measured for each electrolytic capacitor obtained as described above in an environment of 20° C. by using an LCR meter for 4-terminal measurement. The electrostatic capacity was expressed as a relative value when the electrostatic capacity of the Y1 was set to 100, and in a case where the electrostatic capacity was more than or equal to 75, the electrostatic capacity was evaluated as good. Evaluation results are represented in Table 1.

TABLE 1

| Electrolytic capacitor | Solid electrolyte layer | | Filling proportion R1 | Filling proportion R2 | R2/R1 | Evaluation | |
|---|---|---|---|---|---|---|---|
| | Thickness T1 (nm) in a vicinity of outer surface of porous body | Thickness T2 (nm) in a vicinity of center of porous body | (%) of solid electrolyte layer in first region | (%) of solid electrolyte layer in second region | | ESR (mΩ) | Electrostatic capacity (relative value) |
| Y1 | 170 | 51 | 84 | 25 | 3/10 | 7.63 | 100 |
| X2 | 170 | 17 | 84 | 8.4 | 1/10 | 6.97 | 100 |
| X3 | 170 | 5.1 | 84 | 2.5 | 3/100 | 6.76 | 99.7 |
| X4 | 170 | 1.7 | 84 | 0.84 | 1/100 | 6.64 | 97.4 |
| X1 | 170 | 0.51 | 84 | 0.25 | 3/1000 | 6.57 | 86.1 |
| X5 | 170 | 0.17 | 84 | 0.084 | 1/1000 | 6.54 | 75.0 |
| X6 | 170 | 0.051 | 84 | 0.025 | 3/10000 | 6.53 | 67.6 |

In electrolytic capacitors X1 to X6, ESR lower than electrolytic capacitor Y1 was obtained. In electrolytic capacitors X1 to X5, good electrostatic capacity was obtained.

Examples 7 to 9

The conductivity of the solid electrolyte layer was set to a value represented in Table 2. The conductivity of the solid electrolyte layer was adjusted by changing the type of the dopant used for the formation of the first layer and the second layer. Except for the above description, electrolytic capacitors X7 to X9 of Examples 7 to 9 were produced similarly to electrolytic capacitor X1 of Example 1.

Comparative Examples 2 to 4

The conductivity of the solid electrolyte layer was set to a value represented in Table 2. The conductivity of the solid electrolyte layer was adjusted by changing the type of the dopant used for the formation of the first layer and the second layer. Except for the above description, electrolytic capacitors Y7 to Y9 of Comparative Examples 2 to 4 were produced similarly to electrolytic capacitor Y1 of Comparative Example 1.

Examples 10 to 13

The step of forming the solid electrolyte layer was performed as follows.
(First Step)

First, the first layer containing the PEDOT and the dopant was formed to be thin in the first region and the second region of the porous body that includes the dielectric layer on the surface (first step). The first layer was formed by chemical polymerization. The chemical polymerization was performed by using the treatment liquid containing EDOT, a dopant, an oxidizing agent, and water. The first layer was formed to be thin in the first region and the second region by performing chemical polymerization at a low temperature (within a temperature range in which chemical polymerization can be performed at 10° C. or less).
(Second Step)

Subsequently, the second layer containing the PEDOT and the dopant was formed to be thick in the first region of the porous body that includes the dielectric layer on the surface (second step). The same dopant as the dopant used for the formation of the first layer was used as the dopant. The second layer was formed by electrolytic polymerization. The electrolytic polymerization was performed by using a treatment liquid containing EDOT, a dopant, and water. The second layer was formed to be thick in the first region by performing step (2a) of performing electrolytic polymerization at 25° C. with a large current and performing step (2b) of performing electrolytic polymerization for a relatively long time with a small current after step (2a).

The conductivity of the solid electrolyte layer was set to a value represented in Table 2. The conductivity of the solid electrolyte layer was adjusted by changing the type of the dopant used for the formation of the first layer and the second layer.

By doing this, in the second region, the solid electrolyte layer was substantially formed of the first layer. In the first region (particularly on the outer surface side of the porous body), the solid electrolyte layer was formed of the first layer and the second layer. By doing this, the solid electrolyte layer was formed such that a filling proportion of the solid electrolyte layer in the porous body was less in the second region than in the first region.

In the above description, filling proportion R2 of the solid electrolyte layer in the second region was set to 0.25% by adjusting a temperature during chemical polymerization in the first step (step of forming the first layer). Filling proportion R1 of the solid electrolyte layer in the first region was set to 84% by adjusting a magnitude of a current and a time for causing the current to flow during the electrolytic polymerization in the second step (step of forming the second layer). R2/R1 was 3/1000. Thickness T1 of the solid electrolyte layer in the vicinity of the outer surface of the porous body was 170 nm. Thickness T2 of the solid electrolyte layer in the vicinity of the center of the porous body was 0.51 nm.

Except for the above description, electrolytic capacitors X10 to X13 of Examples 10 to 13 were produced similarly to electrolytic capacitor X1 of Example 1.

Comparative Examples 5 to 8

In the second step of the step of forming the solid electrolyte layer, the second layer was also formed to some extent in the second region (near the center of the porous body) by performing electrolytic polymerization at 25° C. with a small current for a relatively long time (without performing step (2a)). Thickness T2 of the solid electrolyte layer in the vicinity of the center of the porous body was set to 51 nm, filling proportion R2 of the solid electrolyte layer in the second region was set to 25%, and R2/R1 was set to 3/10.

Except for the above description, electrolytic capacitors Y10 to Y13 of Comparative Examples 5 to 8 were produced similarly to electrolytic capacitors X10 to X13 of Examples 10 to 13, respectively.
[Evaluation 2]

The ESRs of the electrolytic capacitors were measured similarly to Evaluation 1. Furthermore, a degree of reduction in ESR by setting R2/R1 to be from 3/10 to 3/1000 while maintaining the conductivity of the solid electrolyte layer at a constant value was examined based on the measurement results. Specifically, when the ESR of the electrolytic capacitor in which R2/R1 is 3/1000 and the ESR of the electrolytic capacitor in which R2/R1 is 3/10 which have the same conductivity of the solid electrolyte layer are x and y, respectively, x/y was obtained as the ESR ratio. For example, the ESR ratio in the case of electrolytic capacitor X1 means the ratio of the ESR value of electrolytic capacitor X1 to the ESR value of electrolytic capacitor Y1. The smaller the value of the ESR ratio, the greater the effect of decreasing the ESR. The ESR ratio was obtained for each of electrolytic capacitors X1 and X7 to X13. The evaluation results are represented in Table 2.

TABLE 2

| Electrolytic capacitor | Conductivity [S/cm] of Solid electrolyte layer | R2/R1 | ESR (mΩ) | ESR ratio |
|---|---|---|---|---|
| Y1 | 21 | 3/10 | 7.63 | — |
| X1 | 21 | 3/1000 | 6.57 | 0.86 |
| Y7 | 50 | 3/10 | 5.65 | — |
| X7 | 50 | 3/1000 | 4.48 | 0.79 |
| Y8 | 100 | 3/10 | 4.59 | — |
| X8 | 100 | 3/1000 | 3.69 | 0.80 |
| Y9 | 150 | 3/10 | 4.09 | — |
| X9 | 150 | 3/1000 | 3.42 | 0.84 |
| Y10 | 200 | 3/10 | 3.78 | — |
| X10 | 200 | 3/1000 | 3.28 | 0.87 |
| Y11 | 300 | 3/10 | 3.43 | — |
| X11 | 300 | 3/1000 | 3.11 | 0.91 |
| Y12 | 500 | 3/10 | 3.10 | — |
| X12 | 500 | 3/1000 | 2.95 | 0.95 |
| Y13 | 1000 | 3/10 | 2.84 | — |
| X13 | 1000 | 3/1000 | 2.80 | 0.99 |

Electrolytic capacitors X1 and X7 to X13 exhibited lower ESR than electrolytic capacitors Y1 and Y7 to Y13, respectively. Among the electrolytic capacitors, in electrolytic capacitors X1 and X7 to X12 in which the conductivity of the solid electrolyte layer was 15 S/cm to 500 S/cm, the ESR ratio was less than or equal to 0.95, and the excellent effect of reducing the ESR was exhibited by setting R2/R1 to be less than or equal to 1/10. In particular, in electrolytic capacitors X1 and X7 to X10 in which the conductivity of the solid electrolyte layer was 15 S/cm to 200 S/cm, the ESR ratio was less than or equal to 0.87, and the effect of reducing the ESR by setting R2/R1 to be less than or equal to 1/10 was remarkably obtained.

INDUSTRIAL APPLICABILITY

The present invention can be used for an electrolytic capacitor including a porous anode body and an anode wire partially embedded in the anode body. The electrolytic capacitor according to the present invention can be used for various applications in which low ESR is required.

Although the present invention has been described in terms of presently preferred exemplary embodiments, such disclosure should not be construed in a limiting manner. Various modifications and alterations will undoubtedly become apparent to the person of ordinary skill in the art to which the present invention belongs upon reading the above disclosure. Thus, the appended scope of claims should be construed to cover all modifications and alterations without departing from the true spirit and scope of the present invention.

The invention claimed is:

1. An electrolytic capacitor comprising:
an anode body that includes a porous body and a dielectric layer covering the porous body, the porous body including a valve metal; and
a solid electrolyte layer that covers the dielectric layer, the solid electrolyte layer being filled in a pore of the porous body, wherein:
the porous body includes a first region and a second region other than the first region, the first region being located near an outer surface of the porous body,
the first region is a region in which a distance from the outer surface of the porous body is shorter than 0.5D, where D is a shortest distance between the outer surface of the porous body and a center of the porous body,
a filling proportion R2 of the solid electrolyte layer in the second region is less than a filling proportion R1 of the solid electrolyte later in the first region, and
a ratio R2/R1 of the filling proportion R2 to the filling proportion R1 is less than or equal to 1/10.

2. The electrolytic capacitor according to claim 1, wherein the ratio R2/R1 ranges from 1/1000 to 1/10, inclusive.

3. The electrolytic capacitor according to claim 2, wherein the ratio R2/RJ ranges from 1/1000 to 3/100, inclusive.

4. The electrolytic capacitor according to claim 1, wherein the filling proportion R1 is more than or equal to 80%.

5. The electrolytic capacitor according to claim 1, wherein the filling proportion R2 is less than or equal to 9%.

6. The electrolytic capacitor according to claim 1, in wherein a conductivity of the solid electrolyte layer ranges from 15 S/cm to 500 S/cm, inclusive.

* * * * *